United States Patent [19]

Frederick et al.

[11] Patent Number: 4,655,100

[45] Date of Patent: Apr. 7, 1987

[54] ROLLING ELEMENT JACKSCREW

[75] Inventors: Gary L. Frederick, Loves Park, Ill.; Robert A. Null, Phoenix, Ariz.

[73] Assignee: The Garrett Corporation, Los Angeles, Calif.

[21] Appl. No.: 645,872

[22] Filed: Aug. 28, 1984

[51] Int. Cl.$^4$ ............................................. F16H 25/22
[52] U.S. Cl. .................................. 74/424.8 C; 74/459
[58] Field of Search ................... 74/424.8 C, 424.8 R, 74/89.15, 459

[56] References Cited

U.S. PATENT DOCUMENTS

| | | | |
|---|---|---|---|
| 2,683,379 | 7/1954 | Strandgren | 74/424.8 C |
| 2,924,112 | 2/1960 | Martens | 74/424.8 R |
| 2,966,070 | 12/1960 | Wise | 74/424.8 R |
| 2,966,071 | 12/1960 | Wise | 74/424.8 R |
| 2,974,539 | 3/1961 | Martens | 74/424.8 N |
| 3,014,379 | 12/1961 | Wise | 74/424.8 R |
| 3,173,304 | 3/1965 | Strandgren | 74/459 |
| 3,214,991 | 11/1965 | Perrin | 74/424.8 C |
| 3,226,809 | 1/1966 | Perrin | 29/159.2 |
| 3,595,094 | 7/1971 | Lemor | 74/89.14 |
| 3,726,151 | 4/1973 | Lemor | 74/441 |
| 3,884,090 | 5/1975 | Dock | 74/424.8 C |
| 4,048,867 | 9/1977 | Saari | 74/424.8 B |
| 4,232,695 | 11/1980 | Roberge | 137/1 |

Primary Examiner—Allan D. Hermann
Attorney, Agent, or Firm—Terry L. Miller; Albert J. Miller

[57] ABSTRACT

An improved rolling element jackscrew includes at least three planetary rollers interposed between an inner shaft and an outer nut, wherein one of the shaft and nut is formed with grooved threads of zero pitch and the other bears a spiral or pitched thread having a different number of threads per unit length. The different thread numbers on the nut and shaft are chosen to provide a pattern of nodal points at which the thread crests intersect, with the nodal points arranged along a plurality of equiangularly spaced axial contact lines corresponding with the number of rollers and defining positions of roller installation. The rollers each include axially spaced pairs of enlarged ribs defining axially spaced grooves meshing between the shaft and nut at the respective nodal points.

20 Claims, 7 Drawing Figures

ROLLING ELEMENT JACKSCREW

BACKGROUND OF THE INVENTION

This invention relates generally to rolling element jackscrews designed for converting a rotary input to a linear output with lower internal friction. More particularly, this invention relates to an improved rolling element jackscrew of simplified design which provides a low lead precision linear output with a high mechanical advantage.

Rolling element jackcrews in general are well known of the type including a plurality of elongated threaded planetary rollers meshed between a threaded shaft and a threaded nut. In such devices, the planetary rollers are designed to orbit the shaft while simultaneously rolling about their own axes in response to rotary input driving of either the shaft or the nut. This combined rolling and orbiting motion of the planetary rollers transfers the rotary input from the shaft to the nut, or vice versa, to provide a linear jackscrew output. Advantageously, the rolling action of the planetary roller provides a relatively low friction mechanical coupling between the shaft and nut thereby providing a relatively high efficiency motion conversion device. Rolling element jackscrews of this general type have found widespread use throughout the mechanical arts.

Previous rolling element jackscrews, however, have exhibited a number of disadvantages which have effectively limited their practical utilization. More particularly, many prior jackscrews have been proposed with component thread formation requiring at least some axial migration of the planetary rollers during operation, wherein such migration effectively limits the magnitude of the linear output stroke. In some jackscrew designs, relatively complex mechanisms have been proposed for recirculating the migratory rollers, such as depicted in U.S. Pat. No. 3,884,090, but these jackscrew designs have been undesirably costly and unduly complex while presenting a varying internal torque loading as the rollers move in and out of engagement therewith.

Still other rolling element jackscrew designs have been proposed with the various components having thread forms of a common pitch intended to limit or prevent undesired axial migration of the planetary rollers. However, the use of commonly pitched threads on the shaft and nut limits the position of roller installation to a single circumferential position about the components for each spiral thread, since the commonly pitched threads axially align at only one circumferential position. Since a minimum of three rollers are required to support the shaft within the bore of the nut, at least three thread starts are thus inherently required whenever common thread pitches are used. Unfortunately, the use of multiple or multistart threads substantially increases the linear output stroke in response to a single input rotation to correspondingly decrease the mechanical advantage between the rotary input and the linear output. Moreover, when three or more threads are used, it has been recognized that undesired axial and/or rotational roller slippage can occur, wherein such slippage has in the past been prevented by adding components such as synchronizing gears which undesirably increase jackscrew cost and complexity.

There exists, therefore, a significant need for an improved and mechanically simplified rolling element jackscrew which avoids axially migrating planetary rollers and thus also avoids use of complex roller recirculating mechanisms. Moreover, there exists a significant need for an improved jackscrew designed to substantially prevent axial or rotational roller slippage without requiring use of synchronizing gear components, and which further exhibits a substantially optimized mechanical advantage and load-carrying capacity. The present invention fulfills these needs and provides further related advantages.

SUMMARY OF THE INVENTION

In accordance with the invention, an improved rolling element jackscrew is provided for converting a rotary input into a linear output stroke with a relatively high mechanical advantage and relatively low internal friction. The improved jackscrew comprises three or more elongated and partially grooved planetary rollers arranged in a generally circular pattern and meshed between an inner shaft and an outer nut. One of the shaft and nut includes grooved threads with zero pitch and a selected number of threads per unit length, whereas the other component bears spiral threads having a selected pitch and a different number of threads per unit length. The planetary rollers are meshed between the shaft and nut be means of rib-forming grooves at axially spaced nodal points defined by axially aligned crests of the shaft and nut thread forms. In operation, rotation of either the shaft or nut is transmitted by rolling, orbital motion of the planetary rollers to the other jackscrew component resulting in axial translation thereof through a short linear stroke with high mechanical advantage.

In accordance with one preferred form of the invention, the nut is internally threaded to define the spiral threads of a selected number per unit length and preferably having not more than two thread starts thereby insuring a relatively small pitch or helix angle. The nut shaft is externally threaded with the nonspiraling or grooved threads having a different number per unit length and a zero pitch or helix angle. The comparative numbers of threads per unit length on the nut and shaft are chosen to provide a plurality of thread nodal points defined by axial alignment between thread crests on the nut and shaft, wherein these nodal points are arranged in axially spaced relation along three or more axial lines of contact between the nut and shaft. The planetary rollers are selected to correspond in number with and are respectively installed to extend along the axial lines of contact, with each planetary roller including axially spaced pairs of enlarged ribs defining annular grooves for meshing between the aligned thread crests at said nodal points. A retainer cage supports the planetary rollers in a generally circular array concentrically between the nut and shaft and maintains the angular spacing between the rollers. Alternatively, the shaft may comprise the jackscrew component bearing the spiral threads, and the nut may comprise the component bearing the nonspiraling or grooved threads.

The different numbers of threads per unit length on the nut and shaft, otherwise characterized as different thread spacings, are chosen to provide the nodal points in a repeating angularly spaced pattern around the helix of the spiral thread. This feature is achieved by selecting different thread numbers having a common denominator, wherein the repeating angular locations of the nodal points about the spiral thread may be derived by multiplying 360 degrees times the ratio of the spiral thread number to the groove thread number. This repeating pattern must occur with sufficient frequency to provide three or more equiangularly spaced planetary rollers to provide proper support for the shaft within the bore of the nut.

In use, rotary driving of either than shaft or nut component is transmitted to the other component by a combined rolling and orbital action of the planetary rollers which are positively constrained against axial migration relative to engagement with the grooved threads. However, the rollers and the component bearing the grooved threads are translated axially as a unit along the spiral thread of the other component to provide a linear output translation of relatively short stroke per input revolution, thereby providing a relatively high mechanical advantage. This high output is accomplished with minimal lost motion between the components. The invention is thus particularly useful in torque limited input applications, such as nuclear flow control valves and the like, which require a high-power precision linear output.

Other features and advantages of the present invention will become more apparent from the following detailed description, taken in conjunction with the accompanying drawings, which illustrate, by way of example, the principals of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
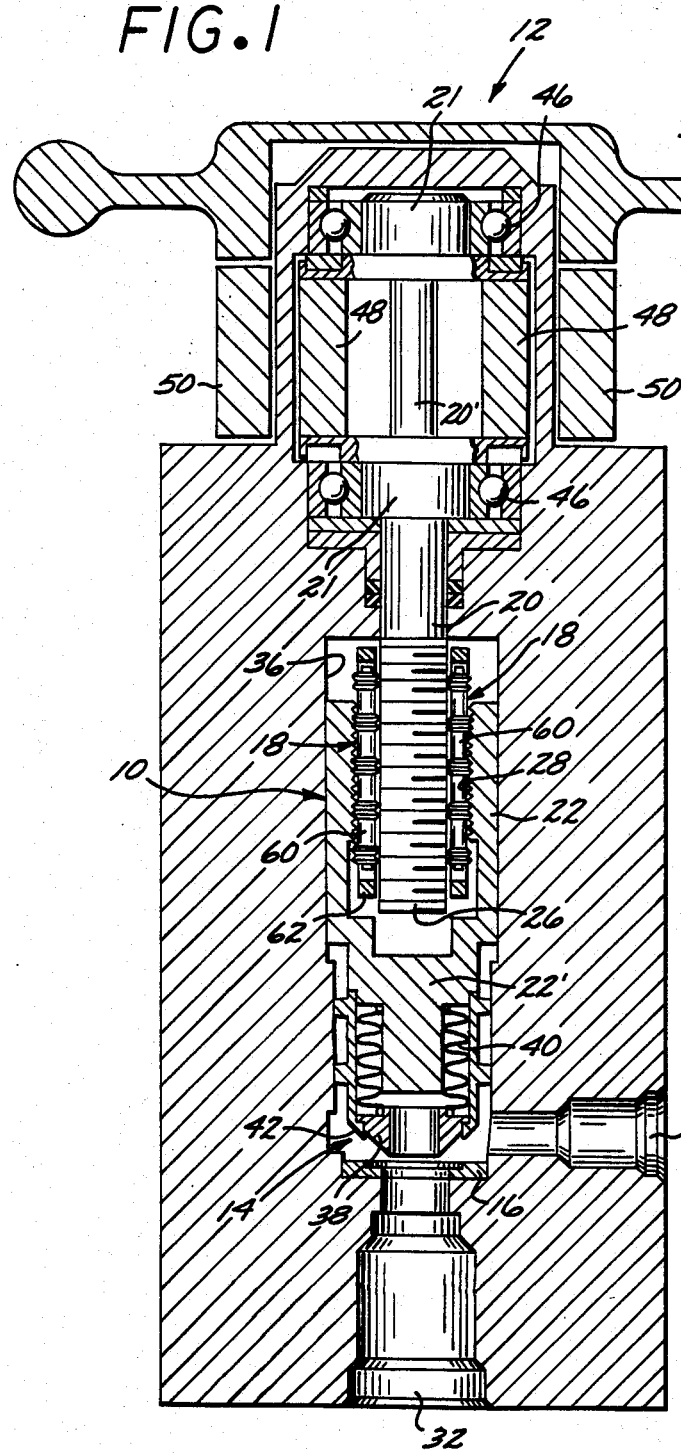
FIG. 1 is a somewhat schematic elevational cross-sectional view of a fluid control valve including an improved rolling element jackscrew embodying the novel features of the invention.
Figure 2:
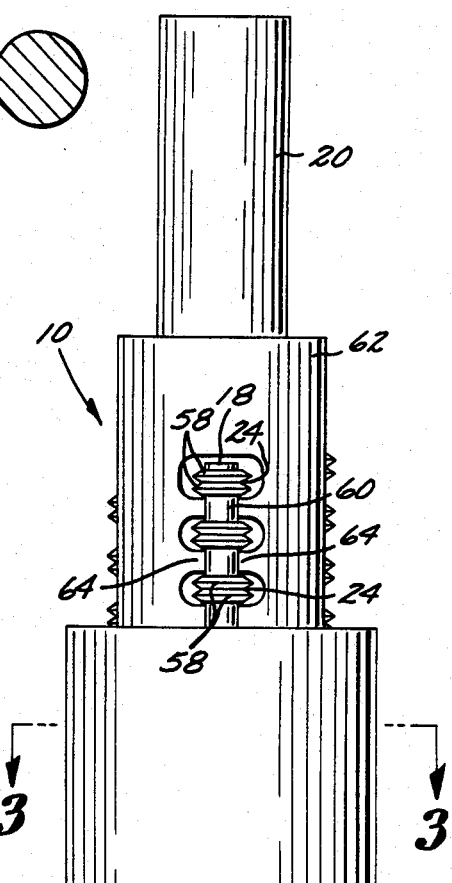
FIG. 2 is an enlarged fragmented elevation view of a portion of the improved rolling element jackscrew.
Figure 3:
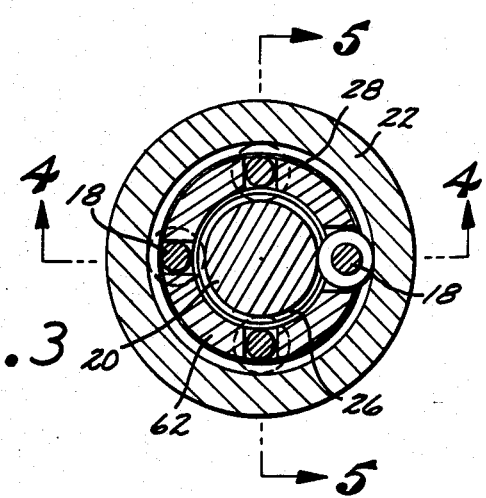
FIG. 3 is a horizontal sectional view taken generally on the line 3—3 of FIG. 2.

As shown in the exemplary drawings, an improved rolling element jackscrew referred to generally by the reference numeral 10 is provided for converting a rotary input to a linear output translation with relatively high mechanical advantage and relatively low internal friction. The improved jackscrew 10 is shown in FIG. 1 in one exemplary operating environment for use with a fluid control valve 12 for shifting a valve head 14 between an open position as illustrated and a closed position (not shown) with respect to a valve seat 16.

The improved rolling element jackscrew 10 of the present invention comprises a simplified jackscrew design for providing a precision linear output stroke with high mechanical efficiency. The jackscrew 10 includes a plurality of elongated planetary rollers 18 arranged in an equiangularly spaced and generally circular array concentrically between an inner shaft 20 and an outer nut 22. These planetary rollers 18 include axially spaced grooves 24 in meshed engagement between threads 26 on the shaft 20 and threads 28 on the nut 22. Importantly, in accordance with a primary aspect of the invention, the threads on one of the shaft and nut components comprises a spiraling thread of selected pitch or helic angle and a selected number of threads per unit length whereas the threads on the other component comprise nonspiraling or grooved threads of zero pitch and a different number of threads per unit length. Selection and design constraints on the thread forms 26 and 28 will be described herein in more detail.

While the improved jackscrew 10 may be used in a wide variety of mechanical applications requiring a linear output translation in response to a rotary input, the invention may be used to particular advantage in environments requiring a relatively high power yet precision linear output stroke in response to a torque limited rotary input, such as in the hermetically sealed fluid control valve 12 depicted in FIG. 1 for controlling, for example, flow of a radioactively contaminated liquid in a nuclear power plant or the like. More particularly, this exemplary fluid control valve 12 includes a valve block 30 defining the valve seat 16 at a position between a fluid inflow port 32 and a fluid outflow port 34, both of which are adapted for appropriate connection to fluid conduits (not shown). The jackscrew 10 is supported within an elongated bore 36 within the valve block 30, with one end 22' of the outer nut 22 extending beyond the planetary rollers 18 and carrying the valve head 14. While this valve head 14 may take any suitable form, the illustrative valve head includes an inner poppet 38 movably supported from the nut end 22' by an impermeable compressible metal bellows 40 or the like and an outer poppet 42 fixed to the nut end 22'. These inner and outer poppets 38 and 42 are designed for sequential engagement with the valve seat 16 to block fluid flow between the ports 32 and 34, with the specific operation of said poppets being described in more detail in commonly assigned U.S. Pat. No. 4,232,695, which is incorporated by reference herein.

Linear translation of the nut 22 within the valve block bore 36 displaces the poppets 38 and 42 relative to the valve seat 16 in response to controlled rotation of the inner shaft 20. More particularly, the inner shaft 20 includes a free end 20' which protrudes from the nut 22 in a direction opposite the poppets to a position generally at the base of a hermetically sealed actuation chamber 44 within the valve block 30. As illustrated, the shaft free end 20' includes a pair of enlarged heads 21 rotationally supported within a respective pair of annular bearing units 46 and linked by said bearing units for rotational movement with an annular set of driven magnets 48 within the chamber 44. These driven magnets 48 may be rotated by an annular set of drive magnets 50 carried in any suitable manner by an actuator wheel 52 or other suitable actuator component mounted outside the hermetically sealed chamber 44, but in close magnetically coupled association with the driven magnets 48 through a thin boundary wall 45 of the chamber to provide a magnetic coupling. Accordingly, rotation of the actuator wheel 52 imparts a rotational driving force via the magnets 50 and 48 to the inner shaft 20 of the jackscrew 10, wherein this rotary input is necessarily limited in torque by the hermetically sealed nature of the magnetic coupling. Further details of preferred magnetic couplings of this general type are provided in common assigned U.S. Pat. Nos. 4,207,485 and 4,277,707, which are incorporated by reference herein.

The rolling element jackscrew 10 transforms the torque limited rotary input applied to the input shaft 20 into a precsion linear output stroke of the outer nut 22 with sufficient high mechanical advantage and with sufficiently low internal friction to insure precision controlled operation in the potentially contaminated and typically nonlubricated environment of the valve block bore 36. The jackscrew 10 advantageously constitutes a relatively simple and therefore relatively economical design in which uncontrolled axial migration of the planetary rollers 18 is prevented to correspondingly avoid any need for a complex and costly roller recirculating mechanism and while providing uniform low internal torque loading through the linear output stroke. Moreover, the jackscrew 10 is designed for little or no axial lost motion or rotational slippage of the rollers 18 to avoid any need for synchronizing gear components of the type commonly used in previous jackscrew designs.

In one preferred form shown in detail in FIGS. 2–5, the outer nut 22 of the improved jackscrew 20 has its threads 28 defining the spiral thread with a relatively small pitch or helix angle, where the helix angle is relatively small to provide a preselected and relatively large number of threads per unit length. This spiral thread 28 has a thread profile sized for meshing engagement with the axially spaced grooves 24 on the planetary rollers 18 which are in turn sized for meshed engagement with the externally formed threads 26 on the inner shaft 20. Importantly, as shown best in FIGS. 4 and 5, the shaft threads 26 comprise grooved threads of zero pitch and a different number of threads per unit length in comparison with the spiral thread 28 on the shaft 120.

The different number of threads per unit length on the inner shaft 20 and the outer nut 22 provide a plurality of nodal points defined by axial alignment between thread crests 54 and 56 of the spiral and grooved thread forms, respectively. These nodal points are spaced axially along the lengths of the shaft and nut components and are located, as will be described, at different angular positions about the circumference of the spiral thread. By appropriate selection of the comparative numbers of threads per unit length, otherwise characterized as thread spacing, the nodal points will occur in a regular angularly spaced pattern about the circumference of the spiral thread and along at least three axial lines of contact each defined by several axially spaced nodal points. The planetary rollers 18 are positioned respectively along these axial lines of contact and include axially spaced pairs of radially enlarged ribs 58 cooperating to define the axially spaced roller grooves 24 meshed between the shaft and nut threads at each or at selected axially spaced ones of the nodal points. Between the pairs of ribs 58, the rollers 18 include reduced diameter regions or gaps 60 to avoid interference with nonaligned threads on the shaft and nut. A sleeve-shaped retainer cage 62 is provided concentrically between the shaft and nut for maintaining generally equiangular spacing of the rollers 18 wherein this cage 62 includes along each axial contact line a plurality of axially spaced and radially open lobes 64 for receiving the pairs of ribs 58. Inwardly projecting pairs of fingers 66 separate the open lobes 64 and extend into generally tangential surface contact with oppsoite sides of the associated roller 18 within the interlobe gaps 60.

To obtain nodal point reoccurrence in a regular pattern along at least three axial lines of contact, the different numbers of threads per unit length on the shaft and nut are chosen as follows, wherein:

S = Number of spiral threads per unit length;
G = Number of grooved threads per unit length;
A = Angular spacing around the spiral thread between consecutive nodal points; and
$A = 360° \cdot (S)/(G)$ By selecting (S) and (G) to have a common denominator, the angular spacing (A) will result in nodal points around the spiral thread in a repeating pattern along one or more axial lines of contact. However, for proper support of the inner shaft 20 within the bore of the outer nut 22, three or more axial contact lines are required to permit use of three or more of the planetary rollers 18. From knowledge of the comparative numbers of spiral and grooved threads on the nut and shaft, the number of rollers (R) may be calculated by:

$(R) \cdot (A)/360 = K$, wherein R is the smallest integer yielding an integer value of K Alternatively stated, the angular spacing between adjacent nodal points must be divisible into 360 degrees or a multiple thereof to yield an integer having a value of at least three.

For example, and for illustrative purposes only, the relative numbers of spiral and grooved threads per inch on the shaft and nut may be chosen to be 24 and 32, respectively, with these numbers having a common denominator of 8. With these thread numbers, nodal points will occur in a regular angular pattern about the helix of the spiral thread with an angular frequency of:

$A = 360° \cdot (24)/(32) = 270°$

The above-calculated nodal point positions will produce a number of axial lines of contact thereby permitting installation of a corresponding number of planetary rollers 18 calculated as follows:

$(R) \cdot (270/360) = K;$ $R = (K)(4/3) = 4$

Figure 4:
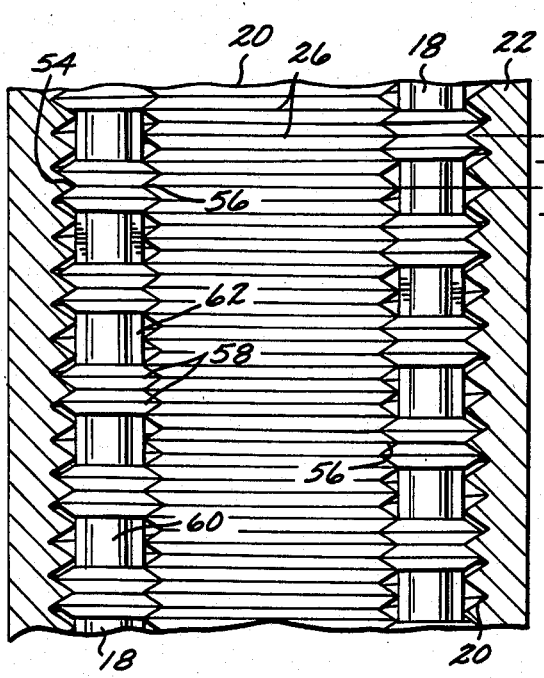
FIG. 4 is an enlarged fragmented vertical sectional view of a portion of the jackscrew, taken generally on the line 4—4 FIG. 3.
Figure 5:
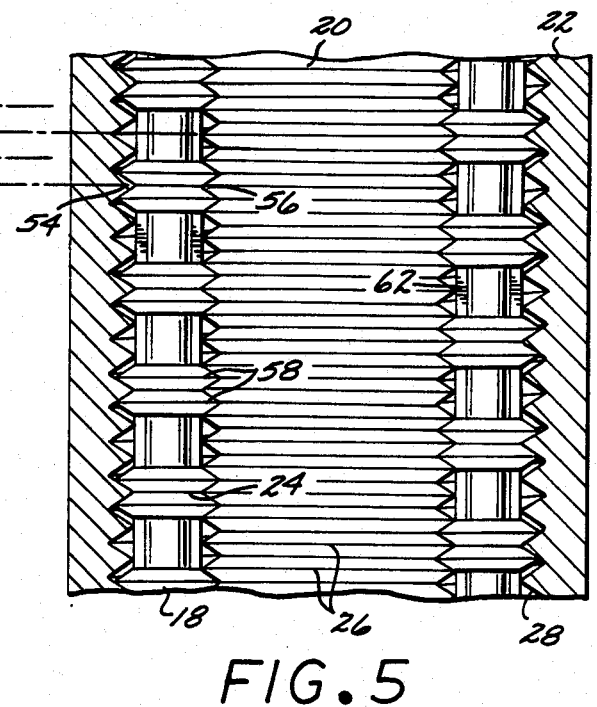
FIG. 5 is an enlarged fragmented vertical sectional view of a portion of the jackscrew taken generally on the line 5—5 of FIG. 3.

Accordingly, in this example, four equiangularly spaced planetary rollers 18 may be supported about the spiral thread with a roller groove 24 disposed in meshed relation between the shaft and nut in 270-degree increments. Alternatively stated, a roller groove 24 on a first of the four planetary rollers 18 meshed between the shaft and nut will be spaced angularly about the spiral thread from the next roller groove 24 in sequence by an angular spacing of 270 degrees, and so forth for additional nodal points, all of which will be located along one of the four axial lines of contact. This exemplary nodal point pattern and use of four planetary rollers 18 is depicted in FIGS. 4 and 5 which respectively illustrate shaft/nut nodal points at the 0–180 and 90–270 degree positions. As can be seen from these drawing figures, the shaft and nut threads axially between the nodal points are not axially aligned thereby requiring the pattern of gaps 60 along the planetary rollers 18 to avoid high friction interference.

In operation, a rotary input imparted to the shaft 20, for example, imparts a rotational and orbital movement to the set of planetary rollers 18 which in turn transfer this rotational movement to and rotatably drive the outer nut 22. Importantly, the nonspiraling or grooved configuration of the rollers 18 and the grooved threads 26 on the shaft 20 prevent roller migration in an axial direction. Instead, the rollers 18 and shaft 20 remain locked against axial motion while displacing the outer nut 22 in a linear motion along the spiral thread 28. This stroke occurs with a relatively high mechanical advantage by virtue of the low lead or helix angle of the spiral thread 28 thereby producing a relatively small linear output in response to a given rotational input.

In the event higher load carrying capability is desired for the jackscrew 10, the spiral thread 28 on the outer nut 22 may be defined by a dual start thread providing nodal points with the shaft along an array of axial lines of contact disposed 180 degrees out of phase with each other. By selecting the dual start thread to accommodate a total of four or more planetary rollers in an equiangularly spaced pattern, the dual thread form may be used but is accompanied by an inherent substantial increase in the pitch or helix angle of the spiral thread to correspondingly decrease mechanical advantage and increase the risk of axial or rotational roller slippage. To avoid such undesirable characteristics, the number of threads in the spiral thread form should not be more than two.

Figure 6:
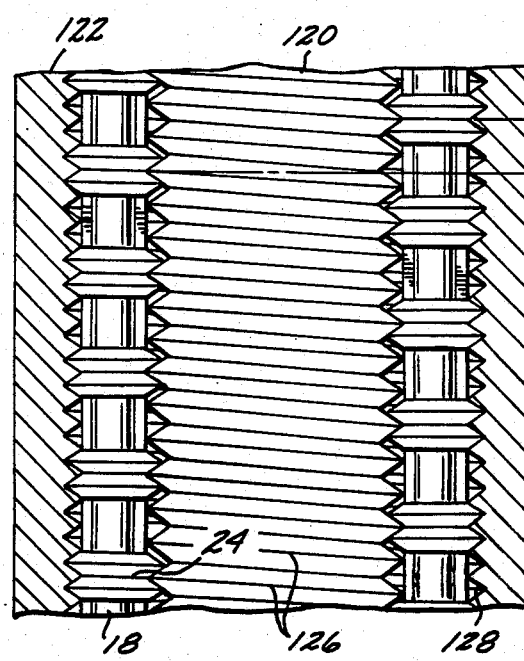
FIG. 6 is an enlarged fragmented vertical sectional view generally similar to FIG. 4 and illustrating an alternative form of the improved jackscrew.
Figure 7:
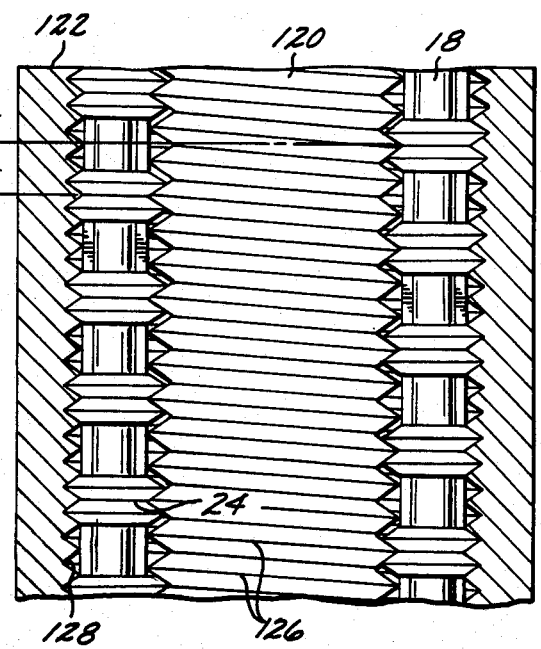
FIG. 7 is an enlarged vertical sectional view generally similar to FIG. 7 and illustrating the alternative form of the jackscrew.

Various modifications to the rolling element jackscrew depicted in FIGS. 1–5 will be apparent to those skilled in the art. For example, the positions of the spiral and grooved threads on the nut and shaft can be reversed. More particularly, with reference to FIGS. 6 and 7, a spiral thread 126 of selected pitch and a selected number of threads per unit length can be formed on a modified inner shaft 120, and grooved threads 128 of zero pitch can be formed with a different number per unit length on a modified outer nut 122. With this arrangement, shaft/nut nodal points and the number of planetary rollers 18 can be determined as described previously, with the rollers 18 having annular grooves 24 meshed between the shaft 120 and nut 122. Rotational driving of the nut 122 thus transmits rotary motion through the rollers 18 to the shaft 120 for linear translation thereof, while the rollers 18 are locked within the grooved threads 128 on the nut to prevent axial migration thereof.

According to still further modifications of the invention, the rotary input can be coupled to either the shaft component or to the nut component of the jackscrew, irrespective of which component bears the spiral threads. Input rotation of the spiral threaded component results in a linear translation on the other component along with the rollers as a unit.

The improved jackscrew 10 of the invention thus provides a simplified jackscrew design which is less costly in construction and which further provides a high mechanical advantage between the rotary input and the linear output. The invention is thus adapted for use in a wide variety of motion conversion applications, particularly those having a torque limited input and/or having special requirements for a high power output.

Other modifications and improvements to the improved rolling element jackscrew described herein are believed to be apparent to those skilled in the art. Accordingly, no limitation on the invention is intended, except as set forth in the appended claims.

What is claimed is:

1. A rolling element jackscrew for converting a rotary input to a linear output, said jackscrew comprising:
 a threaded nut;
 a threaded shaft received coaxially into said nut;
 one of said shaft and nut having a spiral thread with a selected pitch angle and a selected number of threads per unit length and a number of thread starts not exceeding two;
 the other of said shaft and nut having grooved threads of zero pitch and a different selected number of threads per unit length;
 said selected numbers of threads per unit length on said shaft and nut being chosen to provide a plurality of axially spaced nodal points of axial coincidence of said spiral and grooved threads, said nodal points being disposed along at least three axial lines about the circumference of said spiral threads and each of said axial lines including a plurality of said nodal points; and
 at least three elongated planetary rollers arranged in a generally equiangularly spaced pattern concentrically between said shaft and nut, said rollers being provided in a number corresponding with and being installed along the axial lines of said nodal points and each including annular means at a plurality of selected ones of said nodal points and along the lines of said nodal points for meshing between said spiral and grooved threads.

2. The jackscrew of claim 1 wherein said spiral thread is a single start thread.

3. The jackscrew of claim 1 wherein said spiral thread is formed on said nut and said shaft is adapted for connection to the rotary input.

4. The jackscrew of claim 1 wherein said spiral thread is formed on said shaft and said nut is adapted for connection to the rotary input.

5. The jackscrew of claim 1 wherein said shaft and nut are spaced from direct coupling with each other, said rollers comprising the sole means for transferring motion between said shaft and nut.

6. The jackscrew of claim 1 wherein said spiral thread has a relatively small helix angle.

7. The jackscrew of claim 1 wherein said annular means on said rollers comprises a plurality of axially spaced pairs of ribs each cooperating to define an annular groove for meshed engagement with axially aligned crests of said spiral and grooved threads, said pairs of ribs being separated by roller portions of reduced diametric size.

8. The jackscrew of claim 7 further including a generally sleeve-shaped retainer cage interposed between said shaft and nut, said cage having a plurality of axially spaced and radially open lobes formed therein in at least three lines corresponding in number with the number of said rollers and disposed at positions corresponding with said nodal points, said cage further including axially aligned pairs of spaced fingers separating said lobes for engaging opposite sides of said reduced diameter roller portions.

9. The jackscrew of claim 1 further including means for supporting said rollers in a generally equiangular spacing relative to said shaft and nut.

10. The jackscrew of claim 1 wherein said selected numbers of said spiral and grooved threads have a common denominator, and wherein the angular spacing between adjacent nodal points around said spiral thread is divisible into 360 degrees or a multiple thereof to yield an integer of at least three.

11. A rolling element jackscrew for converting a rotary input to a linear output, said jackscrew comprising:

a threaded nut;

a threaded shaft receivable into said nut;

one of said shaft and nut having a spiral thread with a selected pitch angle and a selected number of threads per unit length, the other of said shaft and nut having grooved threads of zero pitch and a different selected number of threads per unit length;

said selected numbers of threads per unit length on said shaft and nut being chosen to provide a plurality of axially spaced nodal points of axial coincidence of said spiral and grooved threads, said nodal points being disposed along at least three axial lines about the circumference of said spiral thread and each of said axial lines including a plurality of said nodal points; and at least three longated planetary rollers arranged in a generally equiangularly spaced pattern concentrically between said shaft and nut, said rollers being provided in a number corresponding with and being installed along the axial lines of said nodal points and each including annular means at a plurality of selected ones of said nodal points and along the lines of said nodal points for meshing between said spiral and grooved threads.

12. The jackscrew of claim 11 wherein said spiral thread has a number of thread starts not exceeding two.

13. The jackscrew of claim 11 wherein said spiral thread is formed on said shaft.

14. The jackscrew of claim 11 wherein said spiral thread is formed on said nut.

15. The jackscrew of claim 11 wherein said annular means on said rollers comprises a plurality of axially spaced pairs of ribs each cooperating to define an annular groove for meshed engagement with axially aligned crests of said spiral and grooved threads, said pairs of ribs being separated by roller portions of reduced diametric size.

16. The jackscrew of claim 11 further including means for supporting said rollers in a generally equiangular spacing relative to said shaft and nut.

17. The jackscrew of claim 11 wherein said selected numbers of said spiral and grooved threads have a common denominator, and wherein the angular spacing between adjacent nodal points around said spiral thread is divisible into 360 degrees or a multiple thereof to yield an integer of at least three.

18. A rolling element jackscrew for converting a rotary input to a linear output, said jackscrew comprising:

a threaded nut;

a threaded shaft receivable coaxially into said nut;

one of said shaft and nut having a spiral thread with a selected pitch angle and a selected number of threads per unit length and a number of thread starts not exceeding two;

the other of said shaft and nut having grooved threads of zero pitch and a different selected number of threads per unit length;

said selected numbers of said spiral and grooved threads having a common denominator to provide a plurality of axially spaced nodal points of axial coincidence of said spiral and grooved threads in a regular angular spacing reoccurring along the axial length of said spiral thread, said angular spacing between said adjacent nodal points along said spiral thread being divisible into 360 degrees or a multiple thereof to yield an integer having a value of at least three, whereby said nodal points are disposed along at least three axial lines about the circumference of said spiral thread;

at least three elongated planetary rollers arranged in a generally equiangularly spaced pattern concentrically between said shaft and nut, said rollers being provided in a number corresponding with and being installed along the axial lines of said nodal points and including means forming annular grooves at at least selected ones of said nodal points along each of said lines of nodal points for meshing between said spiral and grooved threads; and means for supporting said rollers in a generally equiangular spacing relative to said shaft and nut.

19. The jackscrew of claim 18 wherein said shaft and nut are spaced from direct coupling with each other, said rollers comprising the sole means for transferring motion between said shaft and nut.

20. The jackscrew of claim 18 wherein said annular means on said rollers comprises a plurality of axially spaced pairs of ribs each cooperating to define an annular groove for meshed engagement with axially aligned crests of said spiral and grooved threads, said pairs of ribs being separated by roller portions of reduced diametric size.

* * * * *